(No Model.)

F. C. KLIPSTEIN.
WIRE REEL CARRIER.

No. 508,426. Patented Nov. 14, 1893.

Witnesses
C. A. Ford
N. J. Riley

Inventor
Friedrich C. Klipstein,
By his Attorneys,
C. A. Snow & Co.

THE NATIONAL LITHOGRAPHING COMPANY,
WASHINGTON, D. C.

UNITED STATES PATENT OFFICE.

FRIEDRICH C. KLIPSTEIN, OF SAUK CITY, WISCONSIN.

WIRE-REEL CARRIER.

SPECIFICATION forming part of Letters Patent No. 508,426, dated November 14, 1893.

Application filed July 13, 1893. Serial No. 480,372. (No model.)

*To all whom it may concern:*

Be it known that I, FRIEDRICH C. KLIPSTEIN, a citizen of the United States, residing at Sauk City, in the county of Sauk and State of Wisconsin, have invented a new and useful Wire-Reel Carrier, of which the following is a specification.

The invention relates to improvements in wire reel carriers.

The object of the present invention is to improve the construction of wire reel carriers, and to provide a simple and inexpensive one, which will enable barbed fence wires to be readily paid out from a reel or spool, or to be rewound thereon to enable the same to be handled without danger of being injured by it.

The invention consists in the construction and novel combination and arrangement of parts hereinafter fully described, illustrated in the accompanying drawings and pointed out in the claims hereto appended.

Figure 1:
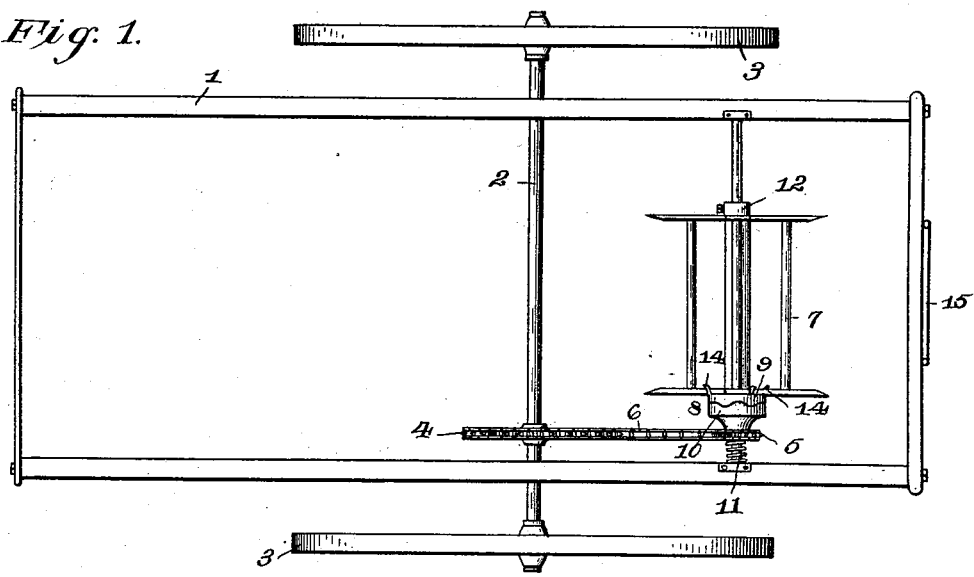
Figure 2:
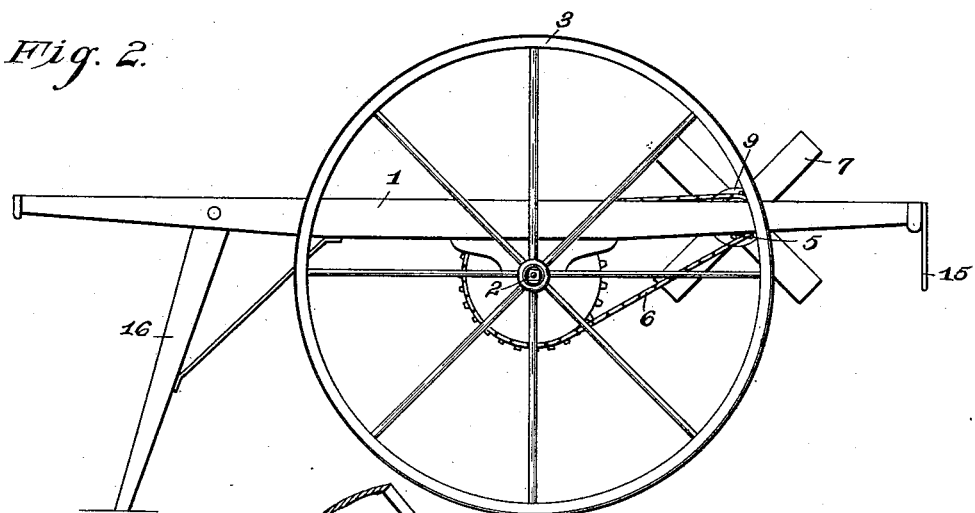
Figure 3:
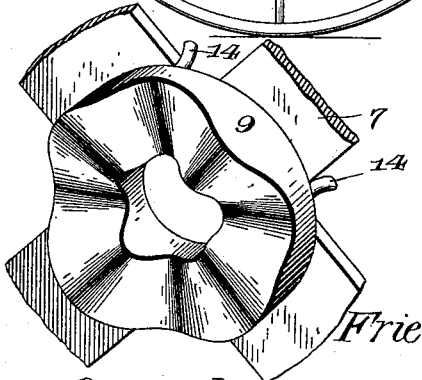

In the drawings—Figure 1 is a plan view of a wire reel carrier constructed in accordance with this invention. Fig. 2 is a side view of the same. Fig. 3 is a detail perspective view of one of the clutch sections.

Like numerals of reference indicate corresponding parts in all the figures of the drawings.

1 designates a rectangular frame mounted on an axle 2 and supported by carrying wheels 3, one of which is fixed to the axle in order to cause the latter to rotate. The axle has mounted on it a sprocket wheel 4, and motion is communicated from the latter to a sprocket pinion 5, by a sprocket chain 6 for rotating a wire spool 7, which is connected with the sprocket pinion by a clutch 8. The clutch 8 consists of two sections 9 and 10, which are attached respectively to the spool 7 and the sprocket pinion 5, and their engaging faces are sinuously curved, and are held in engagement by a spiral spring 11. One end of the spool bears against an adjustable collar 12, and the clutch sections and the sprocket pinion are loosely mounted on the shaft, and the spiral spring 11 is disposed on the shaft and interposed between the outer face of the sprocket pinion and the adjacent side of the frame, and holds the clutch sections into such engagement that a fence wire may be wound up or unwound without liability of breaking. When the tension becomes too great for the fence wire, it will operate to rotate or partially rotate the clutch sections on each other to decrease the tension. The adjustable collar is provided with a set screw for engaging the shaft, and is adapted to permit different sizes of spools to be readily placed on the shaft. The shaft is removably journaled on the frame in any suitable manner; the sprocket pinion is provided at its inner side with an elongated hub; and the section 10 of the clutch, which is fixed to the sprocket pinion, may be formed integral to the hub or secured to the same in any suitable manner. The section 9 of the clutch is provided with inwardly projecting arms 14 for engaging detachably the spool 7, whereby the clutch section 9 is secured thereto.

One end of the frame 1 is provided with a guide 15 for the wire, and the other end has secured to it at each side of it a supporting leg 16.

The sinuous engaging faces of the clutch sections form curved protuberances and depressions, which under excess of tension are adapted to slide readily over each other; and the clutch sections are slightly separable to permit this action, which is automatic.

It will be seen that the wire reel carrier is simple and comparatively inexpensive in construction, that it is adapted for readily unwinding and rewinding fence wire, and that it is capable of enabling barbed fence wire to be readily handled without liability of being injured by it.

Changes in the form, proportion and the minor details of construction may be resorted to without departing from the principle, or sacrificing any of the advantages of this invention.

What I claim is—

1. In a wire reel carrier, the combination of a frame, gearing for rotating a wire spool, and a clutch for connecting a spool with such gearing, and composed of two sections having their opposed faces sinuously curved and yieldingly engaging each other, substantially as described.

2. In a wire reel carrier, the combination of a supporting frame, an axle having the frame mounted on it, carrying wheels journaled on the axle, one of the wheels being fixed thereto, a shaft arranged parallel with the axle, a clutch mounted on the shaft and composed of two sections having sinuously curved engaging faces, one of the sections being provided with means for detachably securing it to a spool, a spring for holding the clutch sections in engagement, and gearing for connecting the clutch with the axle, substantially as described.

3. In a reel carrier, the combination of an axle, carrying wheels, one of the wheels being fixed to the axle, a frame mounted on the axle, a shaft journaled on the frame, a sprocket pinion mounted on the shaft, a sprocket wheel fixed to the axle, a sprocket chain connecting the sprocket wheel and pinion, a clutch mounted on the shaft and composed of two sections having sinuously curved engaging faces, one of the sections being fixed to the sprocket pinion, and the other section being provided with arms for detachably engaging a spool, and a spiral spring disposed on the shaft and holding the clutch sections in engagement, substantially as described.

In testimony that I claim the foregoing as my own I have hereto affixed my signature in the presence of two witnesses.

FRIEDRICH C. KLIPSTEIN.

Witnesses:
CHAS. NAFFZ,
C. JAEGER.